(12) United States Patent
Miyaki (10) Patent No.: US 8,812,354 B2
(45) Date of Patent: Aug. 19, 2014

(54) METHOD AND SYSTEM FOR DYNAMIC SCHEDULING OF CONTENT DELIVERY

(75) Inventor: Ken Miyaki, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 1799 days.

(21) Appl. No.: 11/695,488

(22) Filed: Apr. 2, 2007

(65) Prior Publication Data

US 2008/0243583 A1      Oct. 2, 2008

(51) Int. Cl.
*G06Q 30/00*      (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| | | | |
|---|---|---|---|
| 2002/0056107 A1 | 5/2002 | Schlack | |
| 2004/0031047 A1 | 2/2004 | Legallais et al. | |
| 2004/0268387 A1* | 12/2004 | Wendling | 725/35 |
| 2005/0004994 A1 | 1/2005 | Chevallier et al. | |
| 2005/0283796 A1 | 12/2005 | Flickinger | |
| 2007/0162571 A1* | 7/2007 | Gupta et al. | 709/219 |
| 2007/0167689 A1* | 7/2007 | Ramadas et al. | 600/300 |
| 2008/0040740 A1* | 2/2008 | Plotnick et al. | 725/32 |
| 2008/0189735 A1* | 8/2008 | Barton et al. | 725/32 |

FOREIGN PATENT DOCUMENTS

| | | |
|---|---|---|
| EP | 1531624 A1 | 5/2005 |
| WO | WO2004072761 A2 | 8/2004 |

OTHER PUBLICATIONS

Patent Cooperation Treaty; "Notification of Transmittal of the International Search Report and the Written Opinion of the International Searching Authority or the Declaration" issued in corresponding PCT/US08/058155; mailed Sep. 4, 2008; 2 pages.
Patent Cooperation Treaty; "International Search Report" issued in corresponding PCT/US08/058155; mailed Sep. 4, 2008; 4 pages.
Patent Cooperation Treaty; "Written Opinion of the International Searching Authority" issued in corresponding PCT/US08/058155; mailed Sep. 4, 2008; 6 pages.

* cited by examiner

*Primary Examiner* — Alvin L Brown
(74) *Attorney, Agent, or Firm* — Fitch, Even, Tabin & Flannery LLP (57) ABSTRACT

A method for use in providing content to a user includes providing a first item of content to the user, calculating a first remaining amount of time between an end of the first item of content and an end of a fixed period of time, selecting a second item of content based on information relating to the user and with a length of the second item of content being equal to or less than the first remaining amount of time, and providing the second item of content to the user. A storage medium stores a computer program for causing a processor based system to execute these steps, and a system for use in providing content includes a processing system configured to execute these steps.

26 Claims, 8 Drawing Sheets

METHOD AND SYSTEM FOR DYNAMIC SCHEDULING OF CONTENT DELIVERY

BACKGROUND OF THE INVENTION

1. Field of the Invention

Embodiments of the present invention relate generally to content delivery, and more specifically to the selection and delivery of advertisements and/or programs in television, radio and similar media.

2. Discussion of the Related Art

One traditional form of advertising is the television commercial. Such television commercials typically consist of brief advertising spots that range in length from a few seconds to several minutes. The commercials appear between shows and interrupt the shows at regular intervals. The goal of advertisers is to keep the viewer's attention focused on the commercial.

Advertisement time in television, movies, radio, and potentially streamed Internet content is precious. Usually, a fixed time slot is allocated for a set of commercials, such as for example 120 seconds. While the main show (using TV as an example) is suspended, a fixed set of commercials with a well defined set of running times (e.g., 30 seconds, 45 seconds, 25 seconds, 20 seconds) airs. For example, a set of commercials may run from 9:15:00 to 9:17:00.

It is with respect to these and other background information factors that the present invention has evolved.

SUMMARY OF THE INVENTION

One embodiment provides a method for use in providing content to a user, comprising: providing a first item of content to the user; calculating a first remaining amount of time between an end of a run time of the first item of content and an end of a fixed period of time; selecting a second item of content based on information relating to the user and with a run time of the second item of content being equal to or less than the first remaining amount of time; and providing the second item of content to the user.

Another embodiment provides a storage medium storing a computer program executable by a processor based system, the computer program causing the processor based system to execute steps comprising: receiving a first item of content; determining a first remaining amount of time from a difference between a playing time of the first item of content and a fixed period of time; selecting a second item of content based on information relating to a viewer and with a playing time of the second item of content equal to or less than the first remaining amount of time; and providing the first item of content and the second item of content.

Another embodiment provides a system for use in providing content to a user, comprising: a receiver configured to receive a primary content with a playing time less than a fixed period of time; a viewer profile module configured to receive profile information relating to a viewer; an allocating module coupled to the receiver and the viewer profile module, the allocating module configured to select additional content based on the viewer profile such that a playing of the primary content and the additional content is within the fixed period of time.

Another embodiment provides a method for providing content, comprising: receiving a primary content scheduled to be played within a fixed period of time, the primary content comprising a playing time less than the fixed period of time; and selecting additional content based on a viewer profile; and providing the primary content and the additional content to the viewer to be played within the fixed period of time.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Embodiments of the present invention may be used for presenting content to a viewer. Some embodiments provide a method, apparatus and system for the dynamic scheduling of content delivery.

Figure 1:
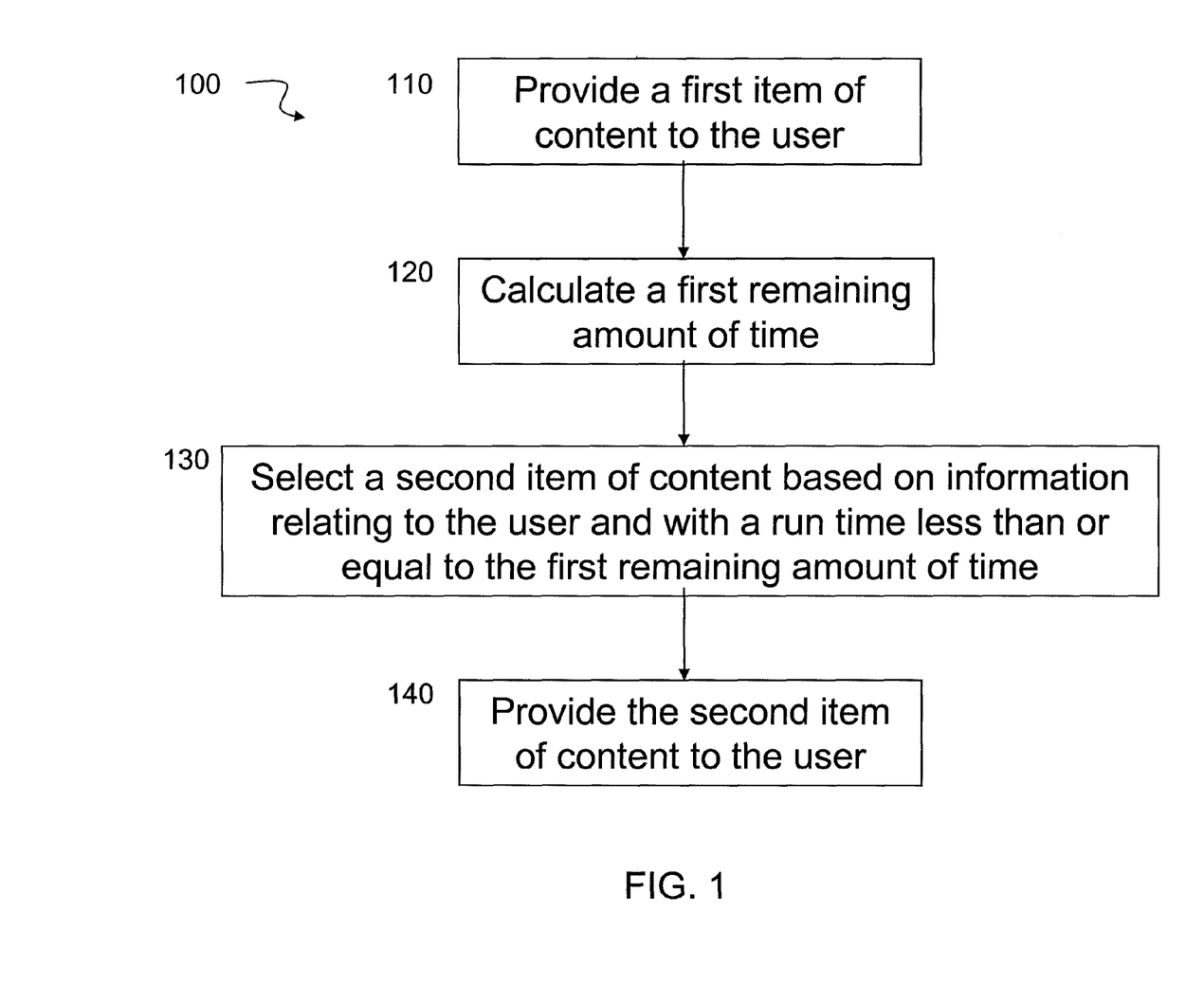
FIG. 1 is a flow diagram illustrating a method for use in providing content to a user in accordance with an embodiment of the present invention.

Referring to FIG. 1, there is illustrated a method 100 that operates in accordance with an embodiment of the present invention. Method 100, may be used in dynamically scheduling content delivery to a user. This method may be implemented generally in any system where content may be provided to play on a module configured to allow the user to experience the content, such as a viewing or listening apparatus. For example, the content may be provided on a television, a computer monitor, a handheld device, a cellular phone, a radio, etc. Furthermore, the content may be provided over a wire or wireless based system, such as a coax-cable, twisted pair, fiber, satellite, radio frequency waves or a cellular system.

The content provided to the user may comprise a plurality of different items of content. The content may include audio and/or visual components including, for example, an advertisement and/or program, such as a movie, television show, radio show, news broadcast, music show or song, etc. The content provided may also comprise a run time, or an amount of time it takes to play the content on the viewing and/or listening apparatus.

Method 100 begins with step 110, wherein a first item of content is provided to the user. Next, in step 120, a first remaining amount of time is calculated between an end point of a run time of the first item of content and an end point of a fixed period of time. In some embodiments, the first item of content may be a program scheduled to be played within the fixed period of time. The program may be configured such that the run time is shorter than the fixed period of time, so as to allow the playing of additional content, such as commercial advertisements, during the first remaining amount of time.

In step 130, a second item of content is selected based on, for example, information relating to the user. Additionally, the second item of content may be selected based on a run time, such that, the run time of the second item of content is equal to, or less than, the first remaining amount of time (calculated in step 120). The information relating to the user may comprise an element or category related to the user experiencing the content, e.g., the user watching the television program. For example, the information relating to the user may comprise gender, age, genre preferences, demographic information, location, etc., of the user. In some embodiments, the information relating to the user may comprise a profile for the user.

In some embodiments, the second item of content may comprise an advertisement such as a commercial. For example, the second item of content may be selected based on the user's gender so as to provide a gender specific commercial advertisement. In other embodiments the second item of content may be selected from among different versions of an advertisement wherein, for example, the advertisement may have multiple versions based on the age, gender, preferences, etc., of the viewing audience. Accordingly, the information related to the user may help dictate which item among the multiple versions of the advertisement is to be selected.

Alternatively or additionally, in some embodiments the second item of content may be selected from among a plurality of items of content having different lengths of run time. Thus, the second item of content may be selected based on the run time of the second item being substantially equal to or less than the first remaining amount of time and/or based on the information relating to the user.

Finally, in step 140, the second item of content selected is provided to the user. For example, in some embodiments, the second item of content may be provided to the user by playing it for the user.

In some embodiments, the method 100 may be implemented in a system where the first item of content provided is a scheduled program being broadcast to a plurality of users. The scheduled program being provided may have an intermission or a plurality of intermissions throughout the playing of the program. These intermissions may cause dead air or a blank screen because the program stops playing for a period of time and then begins playing again. The method 100 may be implemented to analyze the scheduled program for these intermissions and fill the dead air time with additional content. Accordingly, the system may dynamically allocate at least the second item of content to fill at least a portion of an intermission. And even more, the system may dynamically schedule the second item of content to play based on information related to the user.

The method 100, in some embodiments, may further comprise the steps of calculating a second remaining amount of time between an end point of the run time of the second item of content and the end point of the first remaining amount of time. In some embodiments, the entire first remaining amount of time or intermission is completely filled in. Thus, when the second remaining amount of time is greater than a predetermined threshold, for example one or two seconds, the system may further select additional content to substantially fill the entire first remaining amount of time.

Hence, the method 100 may further comprise the step of selecting one or more additional items of content. The selection of the additional items of content may be based on the information relating to the user and/or a total run time of the one or more additional items of content, wherein the total run time may be substantially equal to the second remaining amount of time. For example, the one or more additional items of content may comprise one or more advertisements or station identifications.

Figure 2A:
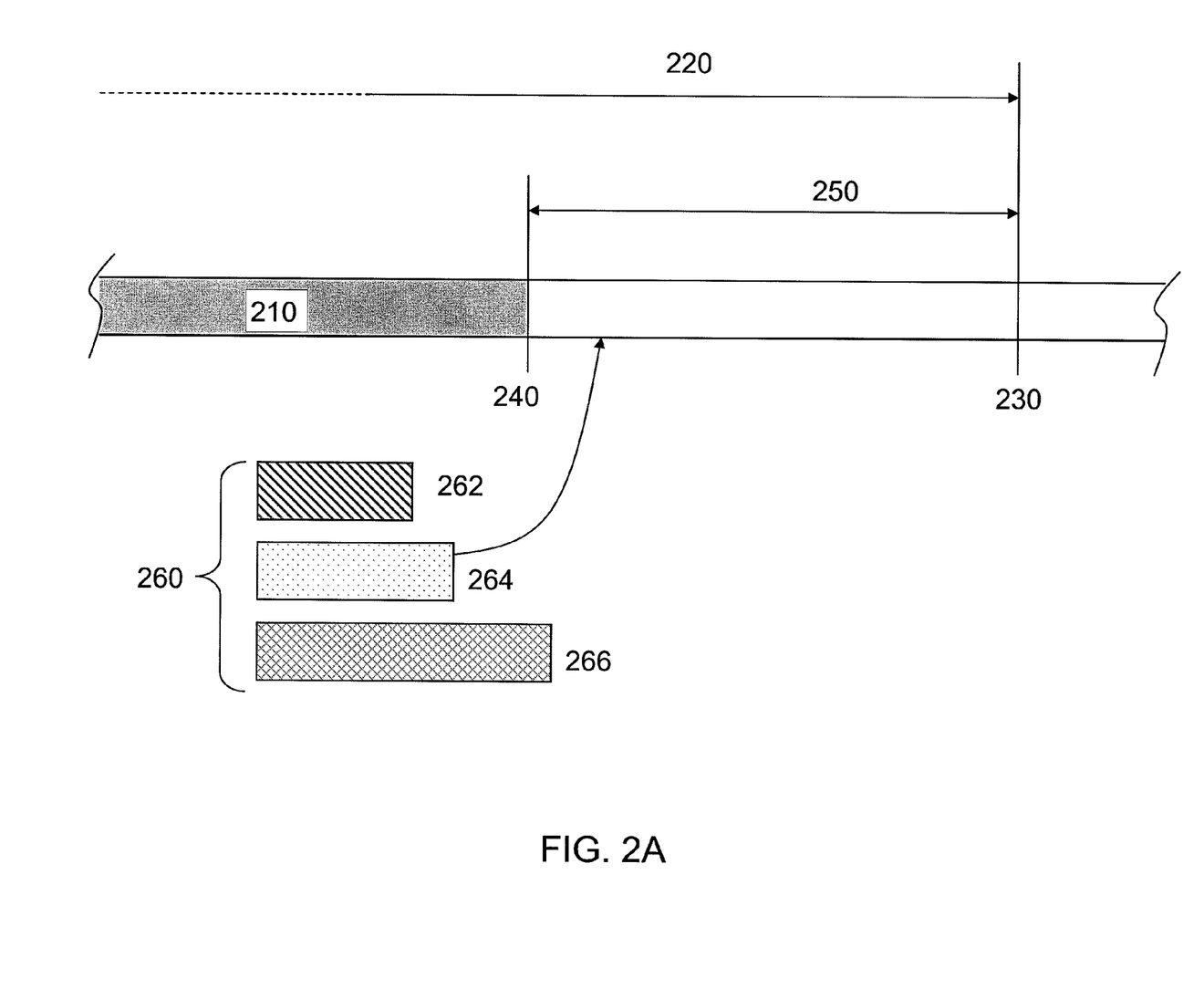
FIGS. 2A and 2B are timing diagrams illustrating an example application of a method in accordance with an embodiment of the present invention.
Figure 2B:
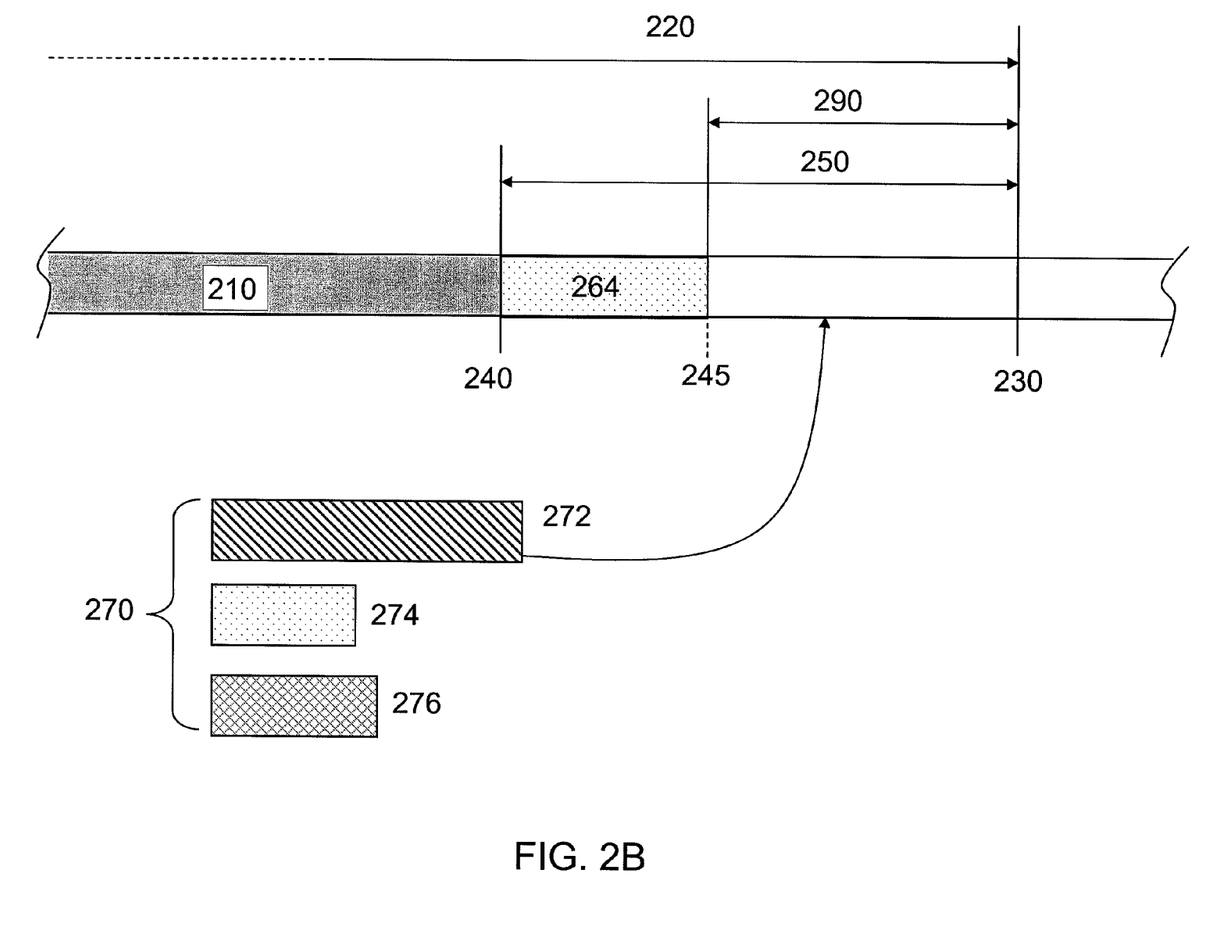

Referring now to FIGS. 2A and 2B, shown are timing diagrams illustrating examples of an implementation of the method 100 for providing content to users. As shown in FIG. 2A, in some embodiments, a first item of content 210 is provided to a user. The first item of content 210 may comprise any type of content, such as a program, movie, commercial, etc. The first item of content 210 may be required to be played within a fixed period of time 220 having an end point 230. In some embodiments where an end point 240 of a run time of the first item of content 210 is prior to the end point 230 of the fixed period of time 220, the system calculates a first remaining amount of time 250 between the end points 230 and 240.

For example, in one implementation, the first item of content 210 provided may comprise a television program that is scheduled to be played prior to 9:00 a.m. Thus, the end point 230 of the fixed period of time 220 is 9:00 a.m. If the end point 240 of the run time of the first item of content 210 is 8:58 a.m., the first remaining amount of time 250 would be two minutes. The system may be configured to dynamically allocate or schedule additional content to be delivered to the user for the first remaining amount of time 250 of two minutes.

As such, the system selects a second item of content with a run time less than or equal to the first remaining amount of time 250. By way of example, the second item of content may be selected from a first group of content 260 comprising any number of items of content, such as items of content 262, 264, 266. In some embodiments the items of content 262, 264, 266 may comprise different versions of the same advertisement, commercial or program. For example, some versions may include adult content that is not appropriate for children or not preferred by some people. Or, the different versions may be targeted to people having different interests or demographics. In some embodiments the items of content 262, 264, 266 may comprise different advertisements, commercials or programs altogether. Whatever the case may be, the information relating to the user may be used to select one of the items of content 262, 264, 266 as the second item of content.

In the illustrated example, item of content 264 is selected and played within the first remaining amount of time 250. Item of content 264, or other possible items of content, may comprise one or more advertisements or any other type of content. As additional examples, the first group of content 260 may comprise one or more advertisements with various run time lengths. Alternatively or additionally, the first group of content 260 may comprise multiple versions of an advertisement with the same or various run time lengths. Therefore, the present embodiment is capable of maximizing the financial value of the first remaining amount of time 250 by dynamically selecting and playing different advertisements during this available time frame. In some embodiments, there is no requirement that the advertisements be a specific length as is required in a traditional television program-commercial advertisement embodiment.

As mentioned above, in some embodiments the content dynamically allocated may be selected based on information relating to the user. For example, personal information about the user may have been entered into the system. This information may comprise the user's age, gender, genre preference, location, etc., all comprising the user's profile. In some embodiments, the age of the user could help dictate which advertisements are presented in the first remaining amount of time. In other embodiments, the age, gender and locality of the user, for example, may be considered when selecting the additional content to present. Furthermore, the first item of content 210 presented to the user may also be selected based on the information relating to the user.

By way of example, the items of content 262, 264, and 266 in the first group of content 260 may be categorized according to specific traits extracted from a plurality of user information, and selected based on the category. In some embodiments the first group of content 260 may be categorized into three different age groups. Item of content 262 may be geared towards audiences or users over the age of 18, item of content 264 may be geared towards users between the ages of 13-18, and item of content 266 may be geared towards users under the age of 13. As such, if the age of viewer is 15 years old, as determined from the user's profile, the content appropriate to provide to the user may be item of content 264. These group categories based on age are just examples of how an embodiment of the invention may function. It is noted that the categories may be based on additional and/or alternative information related to the user depending on the application.

Referring next to FIG. 2B, and continuing with the example illustrated in FIG. 2A, shown is the selection of playing the item of content 264 with a run time less than the first remaining amount of time 250. In some embodiments, an end point 245 of the run time of the item of content 264 played after the end point 240 of the first item of content 210, is prior to the end point 230 of the fixed period of time 220. Accordingly, the system may calculate a second remaining amount of time 290 between the end points 245 and 230. The system may then select one or more additional items of content with a total run time of the one or more additional items of content being substantially equal to the second remaining amount of time 290 in order to fill the gap or dead air time of the second remaining amount of time 290.

For example, an additional item of content may be selected from a second group of content 270 comprising items of content 272, 274, 276. Similar to as described above, the items of content 272, 274 and 276 may comprise different versions of the same advertisement, commercial or program, or they may comprise different advertisements, commercials or programs altogether. In other embodiments, the plurality of content may be categorized based on requirements provided by a television station network.

For example, the different versions of content may be versions rated for adults, young people and children. In some embodiments, there may be fewer violent scenes in the young people and children versions, or they may be additional scenes for the adult version than for the children version. The dynamic scheduling allows the system to select the content from these different versions depending on the user information. Additionally, the different versions of content may have different run times, and thus, using the dynamic scheduling of the content provides more flexibility in deciding what content should be presented. Furthermore, when selecting a shorter version of the content, additional revenue may be realized by increasing the number of, or playing time of, commercial advertisements. In other embodiments, the additional content selected may be a scene or series of scenes cut out from the original program showing, for example, the blunders made by the actors.

Whatever the case may be, the information relating to the user may be is used to select one of the items of content 272, 274 and 276 as the additional item of content. In the illustrated example, item of content 272 is selected. However, in other embodiments, items of content 274 and 276 may be selected to be consecutively played after the second item of content 264 if the total run time of both items of content 274 and 276 is less than the second remaining amount of time 290.

Figure 3A:
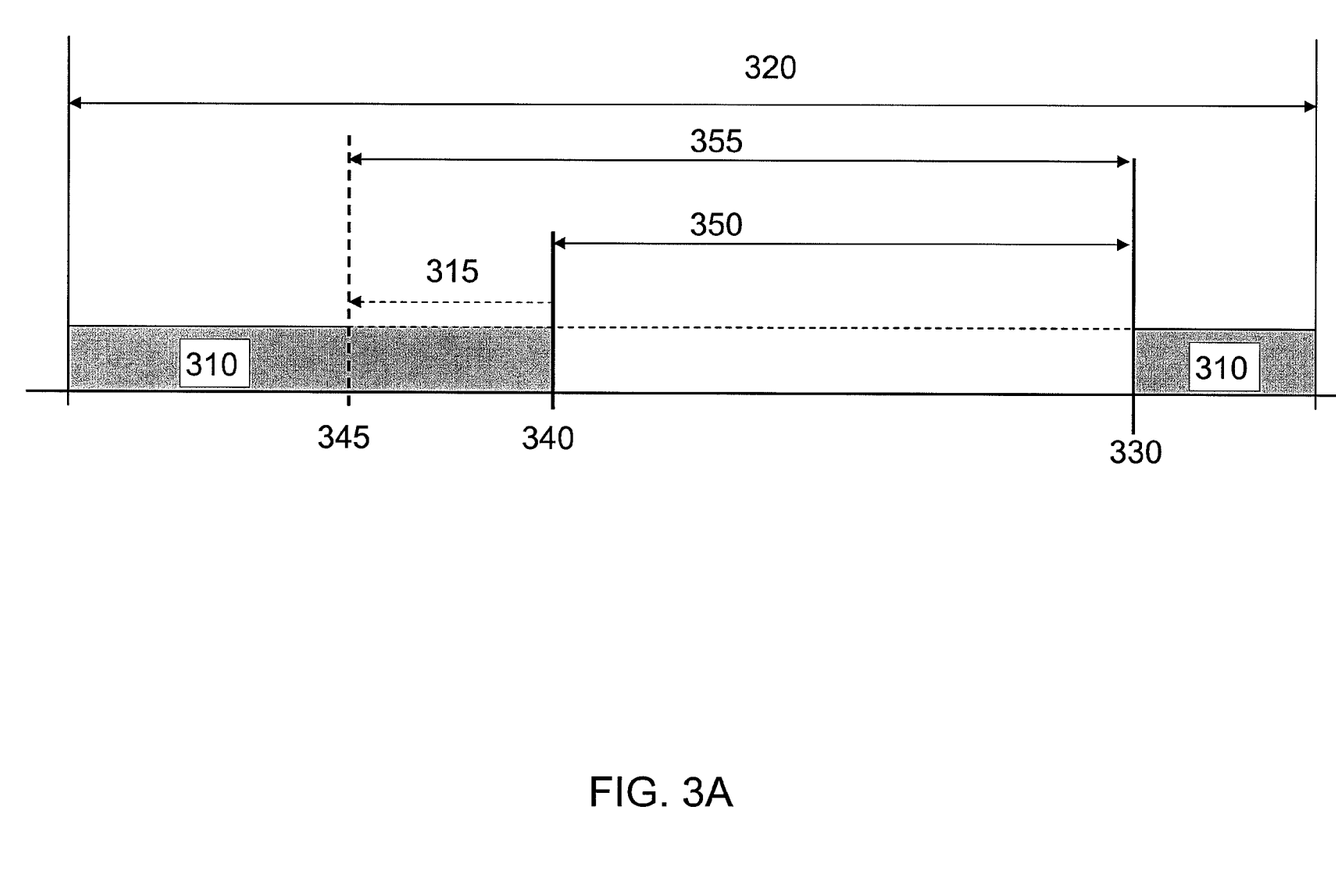
FIGS. 3A and 3B are timing diagrams illustrating another example application of a method in accordance with an embodiment of the present invention
Figure 3B:
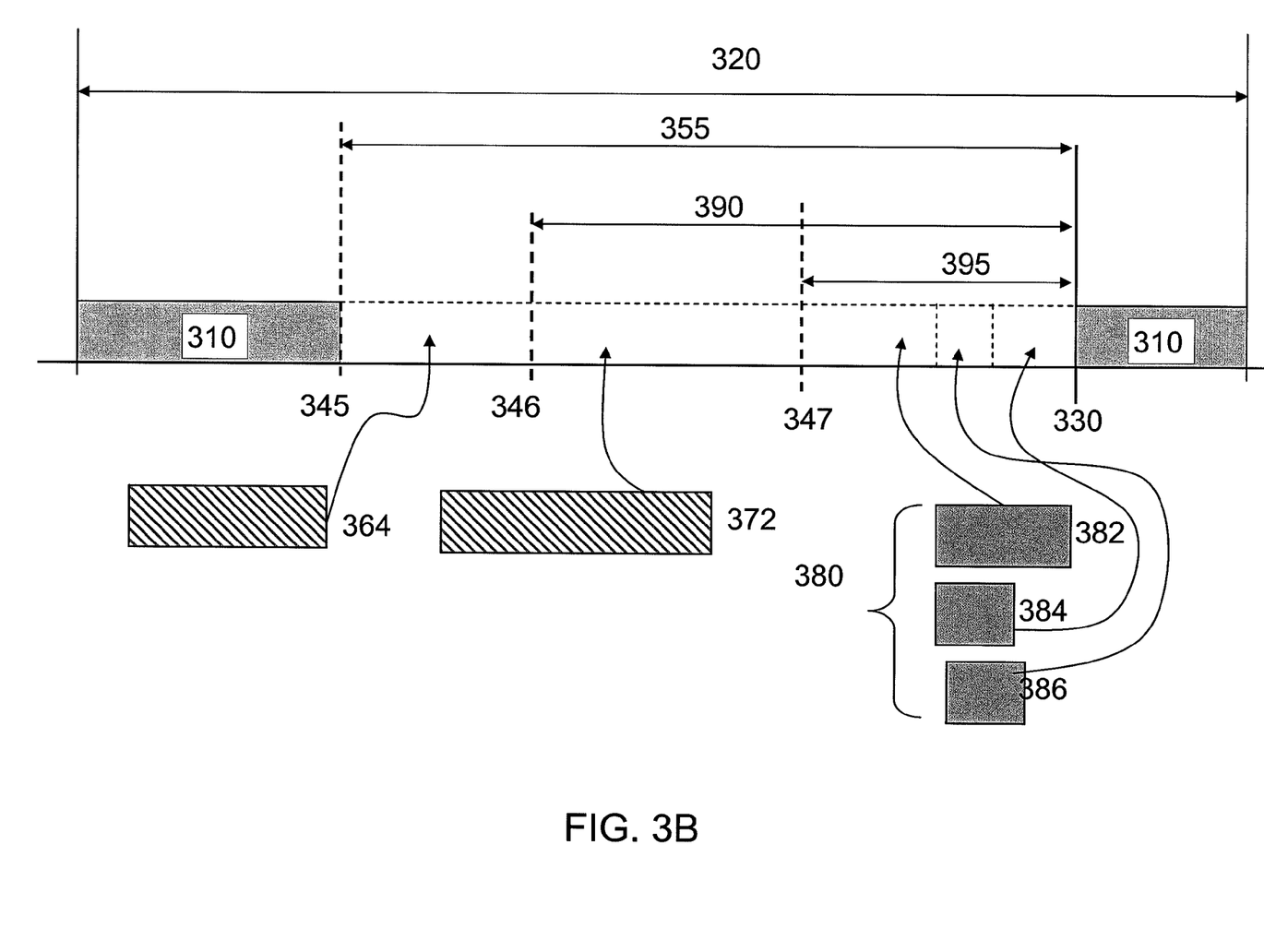

Referring now to FIGS. 3A and 3B, shown is a timing diagram of another embodiment for providing content to a user. FIG. 3A shows a primary content 310 being provided to the viewer. In some embodiments, the primary content 310 may be scheduled to be played within a fixed period of time 320. The primary content 310 may also comprise a playing time less than the fixed period of time 320 and/or an intermission at some point during the fixed period of time 320. The primary content 310 may stop playing at an intermission start point 340, and begin playing again at an intermission end point 330.

In some embodiments, a first remaining amount of time 350 is calculated and additional content is selected by the system to be played within the first remaining amount of time 350. Accordingly, the additional content may be selected such that the primary content 310 and the additional content are to be played fully within the fixed period of time 320. By way of example, the additional content selected may be configured to fill the first remaining amount of time 350, or a plurality of items of content may be selected, wherein the combined playing time of the plurality of items of content fills the first remaining amount of time 350.

As mentioned before, the system providing content may also be configured to select the primary content 310 based on user information. This may comprise selecting between multiple versions of the primary content 310 provided by the content provider, or it may comprise the system modifying the primary content 310 based on the viewer profile.

For example, the system may be in use by a viewer whose viewer profile indicates the viewer is 12 years old. The viewer may want to watch a movie that is rated "R" for being appropriate for mature audiences. The system may modify the "R" rated version to be, for example, a "G" rated version appropriate for the age of the viewer. In other embodiments, the system may choose the "G" rated version from a group. In either case, the "R" rated movie can become a "G" rated movie by removing a scene comprising some of the more mature content, for example. In doing so, the playing time for the movie may be shortened, and/or the intermission start point 340 and the intermission end point 330 of may be altered. Removing the scene from the primary content 310, for example, may reduce the run time of the primary content 310 such that the intermission start point 340 is moved up to an adjusted intermission start point 345.

Accordingly, the system may calculate the difference between the original intermission start point 340 and the adjusted intermission start point 345 to find an additional intermission time 315 that is available for dynamic scheduling of content. In some embodiments, the content provider may be providing the content to fill the first remaining amount of time 350, however, the local system may be configured to dynamically select a first item of content to fill this additional intermission time 315.

In other embodiments, the system may calculate the new total amount of intermission time 355 that may be filled with additional content. And in this case, the system may be configured to dynamically schedule content for the entire intermission, and thus have more time to manage and schedule the playing of additional content. This in turn would provide the scheduler, and thus the viewer, more options and/or combinations of content to be viewed during this intermission time 355. Whatever may be the case, the system improves the viewing experience for the viewer while increasing revenue by playing the additional content.

Referring next to FIG. 3B, there is illustrated an example of providing content during the intermission of the primary content 310 and continues with the example above where the primary content 310 was modified according to the viewer's profile. As this example illustrates, the system may select a first additional item of content 364 to play at or about the adjusted start point 345 of the intermission. The end point 346 of the first additional item of content 364 is used to calculate the second remaining amount of time 390 of the intermission. Next, the system may choose a second additional item of content 372 to be played after the end point 346. In some embodiments, the end point 347 of the second additional item of content 372 is prior to the intermission end point 330, thus a third remaining amount of time 395 is calculated, and accordingly filled.

In some embodiments, the amount of intermission time 355 available to present content may be partitioned off by various levels of distribution by the television network. In some embodiments, the network or a content broadcaster may, for example, require a 120 second spot comprising 30 seconds of national commercial advertisements, 60 seconds of network previews, and 30 seconds of local advertisements. For example, a live broadcast of a sporting event (such as basketball) may go to a commercial break when the team calls a 2-minute timeout. For the national commercial, a 30 second energy drink commercial may be provided; for the network previews a 45 second movie trailer and a 15 second spot showing "coming up after this show are the following: at 10:00, Seinfeld; at 10:30, the Evening news" may be provided; and for the local advertisements, the network may leave that time available for dynamically presenting content relating to the user.

Accordingly, the system calculates the third remaining amount of time 395 to be 30 seconds. The system may be configured to dynamically select the local advertisements from a third group of content 380, that comprises a plurality of items of content 382, 384 and 386. In some embodiments, some of the items in the third group of content 380 may be, for example, local advertisements, local station identifications, marketing logos, and/or alternative unplayed scenes from the primary content 310.

In some embodiments, for example, alternative unplayed scenes may be provided by the network that better match the viewer's preferences. For example, when an "R" rated version of primary content 310 is provided by the network, alternative unplayed scenes that are "G" rated may also be provided in case the primary content is modified into a "G" rated version by removing mature content.

In some embodiments, the system may also select a marketing logo or local station identification from the third group of content 380. In some embodiments, the playing time of the marketing logo or station identification provided may be too long or too short compared to remaining amount of time needed to be filled. However, such items of content may be modifiable such that the system may modify the playing time by lengthening or shortening it to substantially fill the remaining amount of time.

By way of an example for dynamically scheduling content during the third remaining amount of time 395, the system may begin by accessing the viewer's preferences to determine the location of the viewer and viewer's food preferences. The system may select and provide item of content 382 that may be a local restaurant advertisement lasting 20 seconds for "Come eat at Joe's Organic Pizzeria, conveniently located on the corner of Main St. and 3rd. in Menlo Park. Open till 9 pm, 7 days a week".

Selecting the item of content 382 leaves a 10 second period of time that may still be filled. As described above, the system is aware of the viewer's age and has accordingly removed the mature content from the primary content 310. Thus, a next step by the system may be to choose one or more of the alternative unplayed scenes provided in the third group of content 380. For example, item of content 384, a "G" rated unplayed scene, may be played at the end of the intermission in the third remaining amount of time 395 in order to flow with the returning playing of the primary content 310.

In continuing with the example, the item of content 384 selected may be an unplayed scene with a playing time of 7 seconds, thus leaving 3 seconds of dead air time for the time slot dedicated to dynamic scheduling. Next, the system may select the item of content 386, a station identification with a playing time of 5 seconds, for example, to fill the 3 seconds of dead air time. The playing time of the item of content 386 is actually 5 seconds, and thus, the system may modify the playing time length of the item of content 386 to 3 seconds, such that the total playing time of the selected items of content 382, 384 and 386 is substantially equal to the entire third remaining amount of time 395 of 30 seconds.

It is noted that the system as illustrated in FIG. 3B may also be configured to schedule only a single item of content from the third group of content 380 to be played, and may accordingly modify the playing time to substantially fill the third remaining amount of time 395 if needed. Furthermore, the system may be configured to dynamically schedule all of the content to be delivered during the entire intermission (e.g., across all 120 seconds), and may do so according to information relating to the user. This allows greater flexibility across the entire commercial air-time (and not just the subset of 30 seconds) because the total time in which to shuffle content is greater.

As described above, the system may select from a group of a plurality of content, and for example, there may be subsets of groups based on different categories. The categories may be, for example, national advertisement, local advertisements, program previews, etc. These subset of groups may then be further categorized according to other pertinent marketing information such as the age, gender, time of viewing and/or locality of the viewer. Additionally, the content may be provided grouped in such categories, for example, or the system may locally modify, sort and store the content according to such categories. Whatever may be the case, the system is capable of dynamically modifying and allocating the primary and/or additional content as required by the application.

Figure 4:
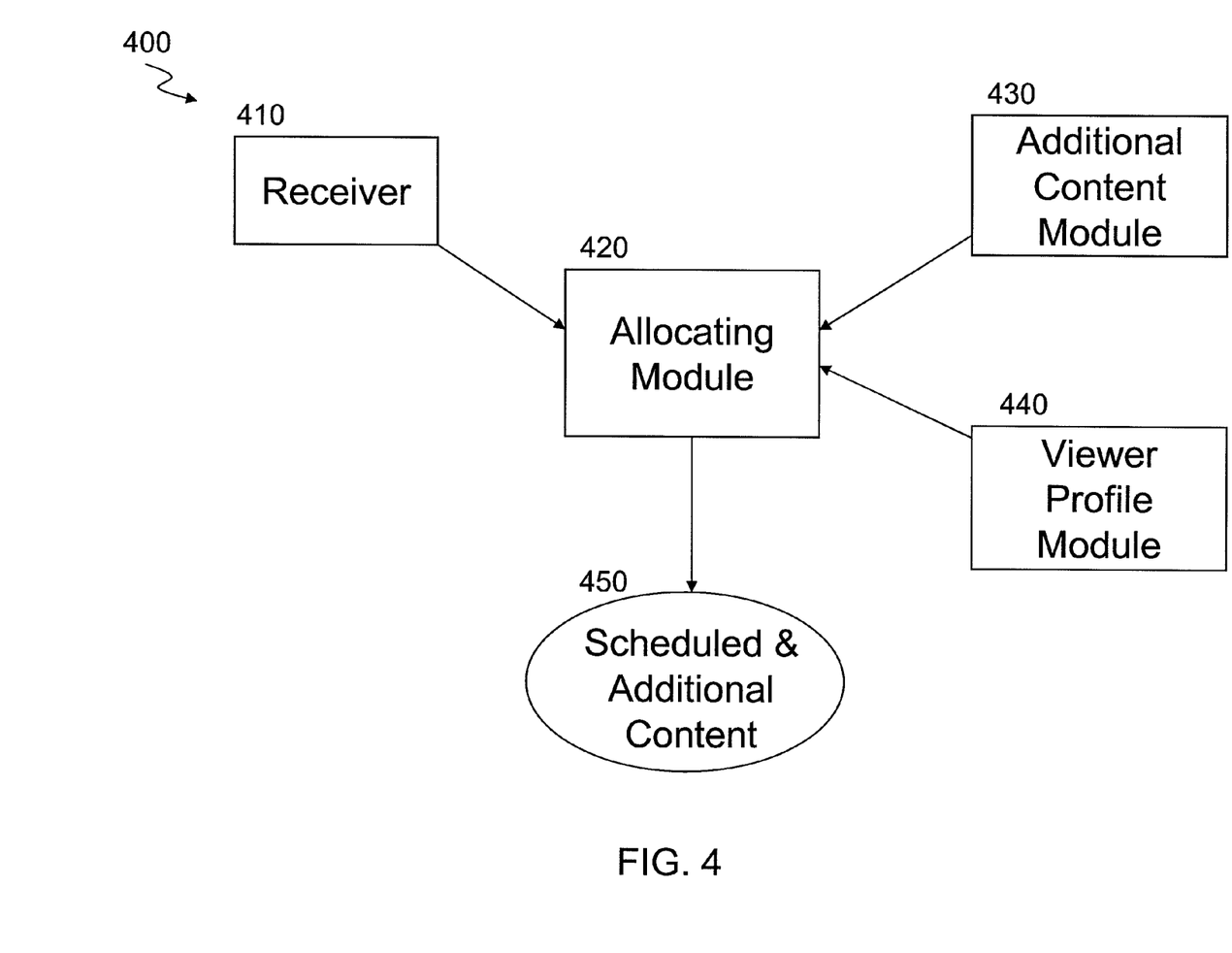
FIG. 4 is a block diagram illustrating an example implementation in accordance with an embodiment of the present invention.

Referring now to FIG. 4, shown is a block diagram of an embodiment for providing content to a user. In the system 400, a receiver 410 may be coupled to an allocating module 420, and the allocating module 420 may be further coupled to an additional content module 430 and a viewer profile module 440. The receiver 410 may be configured to receive a first item of content. The viewer profile module 440 may be configured to receive profile information relating to a viewer. And the allocating module 420 may be configured to select and schedule additional content from the additional content module 430. The additional content may be selected based on the profile information received by the viewer profile module 440 and/or timing of the first item of content received by the receiver 410.

In some embodiments, the playing time of content is scheduled so that viewers will know at what time a certain program will be playing. For example, a traditional television network typically schedules content to be played within a fixed period of time, as to not interfere with other scheduled content (e.g., starting on the hour or half hour). The program is received by the receiver 410 in addition to information indicating the fixed period of time that the program is required to be played within. Or, in other embodiments, where the content is being streamed to the receiver 410, the receiver 410 may also be receiving information regarding the timing of breaks or intermissions of the streaming content.

In other embodiments, content is provided on-demand by viewers, wherein the play time is not scheduled. In such embodiments, the total run time of the content may be required to be within a fixed period of time, or information regarding the timing of breaks within the on demand content is provided to the receiver 410.

When a run time of scheduled content is less than the fixed period of time, or there are breaks or dead air time in the content, the system 400 may be configured to provide additional content 430 to fill in the gaps, e.g., filling in the dead air time. Additionally, the timing of the breaks or intermissions may be scheduled for certain time slots and/or may be dynamically provided by the system. Whatever may be the case, the allocating module 420 selects the additional content 430 such that both scheduled content and the additional content 430 are provided to the viewer within the fixed period of time. In some embodiments, the allocating module 420 selects additional content 430 to fill in the breaks or intermissions of the content.

For example, in some embodiments, live programs are being broadcast or streamed to a viewer. Live broadcasts, such as a news broadcast or a sporting event, may have random events occur that allow for the program to break into an intermission. In such embodiments, the allocating module 420 may be configured to dynamically schedule additional content to be played during these random intermissions. In other embodiments, the allocation of additional content is provided by the allocating module 420 upon receiving an indication from the receiver 410 or the source of the content to start providing content. The allocating module 420 may be configured to provide additional content for a period of time or until an indication to stop providing content is received.

As described above, in some embodiments, the allocating module 420 may be configured to select additional content based on profile information in the viewer profile module 440. Additionally or alternatively, the system 400 may be configured to dynamically select a version of the primary content, based on the profile information, for example, from multiple versions configured for different user profile information. The multiple versions may differ in run time and/or intermission times, and thus, the allocating module 420 may dynamically schedule additional content 430 to fill dead air time depending on the version of primary content chosen.

In some embodiments, the system 400 may be configured to modify the primary content and/or the additional content based on the viewer's profile information, and schedule and play the additional content within the dead air time resulting from the modification. Furthermore, it is noted that the receiver 410, allocating module 420, additional content module 430, or the viewer profile module 440 and/or any combination of these modules, may be configured to modify the primary content and/or additional content.

Figure 5:
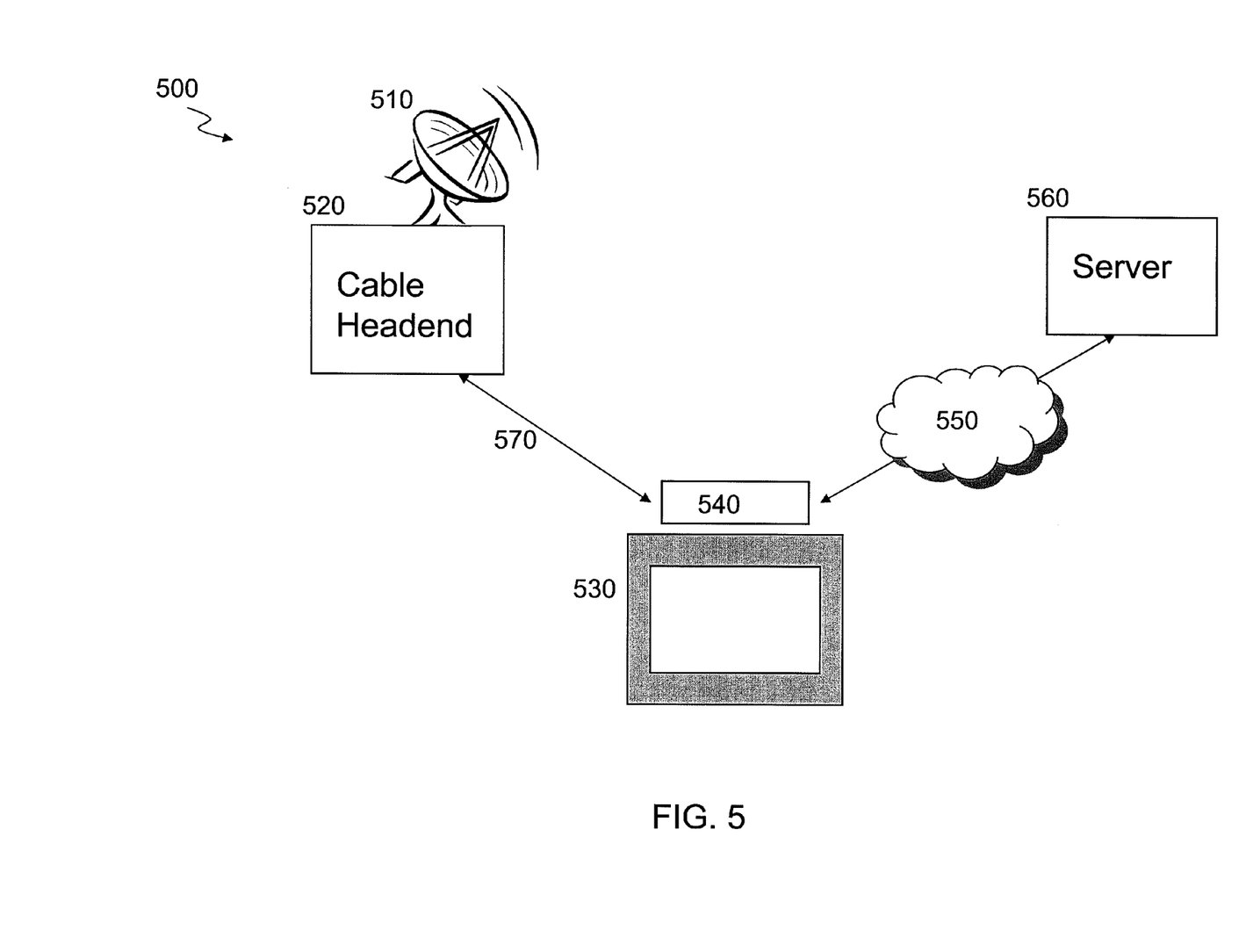
FIG. 5 is a block diagram illustrating another example implementation in accordance with an embodiment of the present invention.

Referring now to FIG. 5, shown is a block diagram of an embodiment for providing content to a user. The system 500 may be configured with a content broadcaster 510 in communication with a cable headend 520. The cable headend 520 may be in communication with a set top box 540 either through a wire or wireless connection 570. The set top box 540 may also be in communication with a viewing apparatus 530 where a user views the content.

The viewing apparatus 530, for example, may comprise a television, a monitor coupled to a computer, a handheld device configured to show content, a projector, etc. The set top box 540 is configured to receive content from a content source and provide the content to the viewing apparatus 530. In some embodiments, the set top box 540 is a device configured to receive analog and/or digital content, and may be configured to translate the content into a format understood by the viewing apparatus 530. In some embodiments, the set top box 540 is coupled to a satellite dish receiving content broadcasted from satellite systems, for example, the cable headend 520.

In some embodiments, content presented to the user may be received from the content broadcaster 510. In other embodiments, content may be received from a server 560 that is in communication with the set top box 540, and in some embodiments, the communication with the server 560 is over a wide area network 550, such as the Internet. As described above, content may include advertisements and programs, such as movies, television shows, etc., and may arrive in multiple versions to be selected depending on the information relating to the user.

The system 500 may be configured to provide content to a user as described in reference to FIGS. 1-4 above. The system 500 may be configured to receive content, for example, from the cable headend 520, and dynamically calculate the amount of dead air time available to fill with additional content. The system 500 may be configured to then select additional content to present to the user to at least partially fill the dead air time. The additional content may be obtained, for example, from different sources such as the content broadcaster 510, the server 560, a network, the internet, or a hard disk drive or other storage device, etc. In some embodiments, the system 500 may select additional content from the server 560 over the wide area network 550 based on information relating to the user, wherein the total run time of provided content and dynamically allocated additional content is less than or equal to a fixed period of time.

In some embodiments, the user may enter in preferences and profile information by using the viewing apparatus and an input module (not shown). The set top box 540 may be configured to securely store the user information and provide it to other systems upon request by authorized devices. In some embodiments, the cable headend 520 may access the user information and do the selecting and/or modifying of at least the provided content and/or the additional content to be dynamically presented based on the user information. In other embodiments, the set top box 540 may access the user information and do the selecting and/or modifying the content based on the user information. In yet other embodiments, an additional device may be installed in the system 500 specifically configured to do the functions of selecting of content, calculating remaining time, modifying and scheduling the playing of the content as described in reference to FIGS. 1-4.

Figure 6:
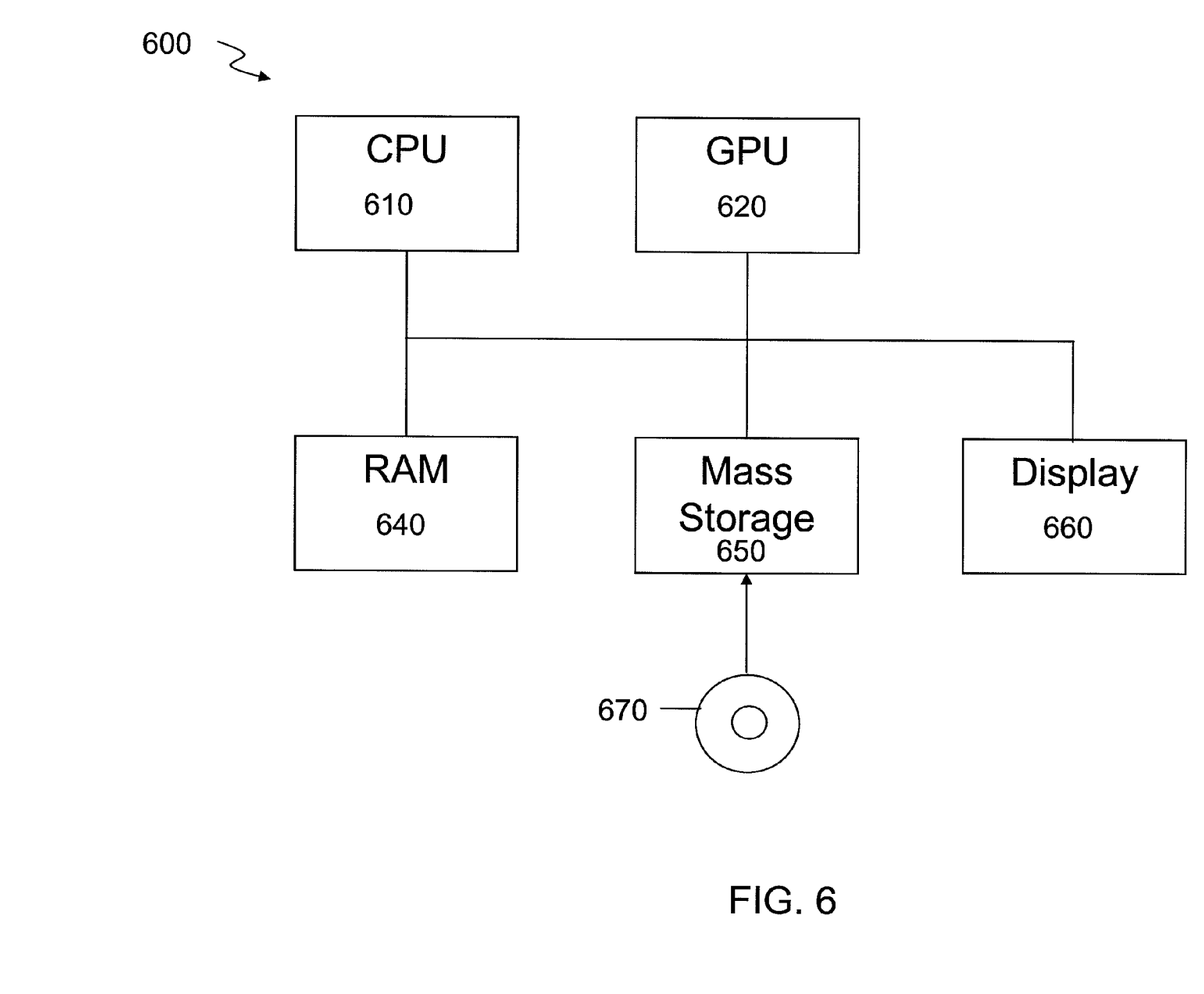
FIG. 6 is a block diagram illustrating a processor based system that may be used to run, implement and/or execute the methods and/or techniques shown and described herein in accordance with embodiments of the present invention.

Referring next to FIG. 6, there is illustrated a system 600 that may be used for implementing the dynamic scheduling of content; however, the use of the system 600 is certainly not required. The methods and techniques described herein may be utilized, implemented and/or run on many different types of computers, graphics workstations, televisions, entertainment systems, video game systems, DVD players, DVRs, media players, home servers, video game consoles, and the like.

By way of example, the system 600 may include, but is not required to include, a central processing unit (CPU) 610, a graphics processing unit (GPU) 620, a random access memory (RAM) 640, and a mass storage unit 650, such as a disk drive. The system 600 may be coupled to, or integrated with, a display 660, such as for example any type of display, including any of the types of displays mentioned herein.

The CPU 610 and/or GPU 620 may be used to execute or assist in executing the steps of the methods and techniques described herein, and various program content and images may be rendered on the display 660. Removable storage media 670 may optionally be used with the mass storage unit 650, which may be used for storing code that implements the methods and techniques described herein. However, any of the storage devices, such as the RAM 640 or mass storage unit 650, may be used for storing such code. Furthermore, the code may be stored within a plurality of storage mediums and systems described herein. Either all or a portion of the system 600 may be embodied in any type of device, such as for example a television, computer, video game console or system, or any other type of device, including any type of device mentioned herein.

In some embodiments, a removable storage media 670 stores a computer program executable by a processor based system 600. The computer program causes the processor based system 600 to execute steps comprising receiving a first item of content and determining a first remaining amount of time from a difference between a playing time of the first item of content and a fixed period of time. The computer program further causes the processor based system 600 to select a second item of content based on information relating to a viewer and with a playing time of the second item of content equal to or less than the first remaining amount of time. The computer program causes the processor based system 600 to provide the first item of content and the second item of content.

In some embodiments, the first item of content is scheduled to be played within the fixed period of time, and the computer program causes the system 600 to play the first item of content and the second item of content within the fixed period of time for the viewer. In further embodiments, the computer program causes the system 600 to select a version of the first item of content based on a viewer profile. In some embodiments, the viewer profile is stored in the mass storage module 650 of the system 600.

In some embodiments, the computer program, as described above, may be configured to be updatable to address potential optimizations, or changes as necessitated by business needs. Furthermore, the computer program may use any number of data transport protocols, including the network, or code packaged as part of the actual content being delivered. By way of example, implementing updates and/or changes to the program may comprise the ability to decode movies using new codecs, and/or performance enhanced versions reducing the time required to perform scheduling calculations.

While the invention herein disclosed has been described by means of specific embodiments and applications thereof, numerous modifications and variations could be made thereto by those skilled in the art without departing from the scope of the invention set forth in the claims.

What is claimed is:

1. A method for use in providing content to a user, comprising:
    providing a first item of content to the user, wherein the first item of content is provided to the user by being broadcast to a plurality of users;
    calculating, using a processor based apparatus, a first remaining amount of time between an end of a run time of the first item of content and an end of a fixed period of time;
    selecting a second item of content based on information relating to the user and with a run time of the second item of content being equal to or less than the first remaining amount of time, wherein the selecting the second item of content further comprises both determining whether to increase a number of items of content to be played back within the first remaining amount of time and determining whether to increase a playing time of one or more of the number of items of content to be played back within the first remaining amount of time; and
    providing the second item of content to the user; and
    modifying, prior to the providing the second item of content to the user, the run time of the second item of content such that a modified run time of the second item of content fits within the first remaining amount of time between the end of the run time of the first item of content and the end of the fixed period of time;
    wherein the second item of content is selected from a group of content comprising a plurality of items of content that could each serve as the second item of content.

2. A method in accordance with claim 1, further comprising:
    partitioning the first remaining amount of time into multiple levels of distribution such that two or more levels of distribution partitioned within the first remaining amount of time are defined for different levels of distribution, wherein the multiple levels of distribution comprise a national level of distribution corresponding to content to be distributed nationally and a local level of distribution corresponding to content to be distributed locally while not being distributed nationally, and wherein the second item of content corresponds with a first level of distribution of the multiple levels of distribution.

3. A method in accordance with claim 1, wherein the second item of content is selected from among different versions of an advertisement.

4. A method in accordance with claim 1, wherein the second item of content is selected from among items of content having different lengths of run time.

5. A method in accordance with claim 1, wherein the information relating to the user comprises a profile for the user.

6. A method in accordance with claim 1, further comprising the step of:
    calculating a second remaining amount of time between an end of the run time of the second item of content and the end of the fixed period of time.

7. A method in accordance with claim 6, further comprising the step of:
    selecting one or more additional items of content based on the information relating to the user and with a total run time of the one or more additional items of content being substantially equal to the second remaining amount of time.

8. A method in accordance with claim 7, wherein the one or more additional items of content comprise one or more advertisements.

9. A method in accordance with claim 1, wherein the first item of content comprises a program.

10. A method in accordance with claim 1, further comprising the step of:
    selecting the first item of content based on the information relating to the user.

11. A method in accordance with claim 10, wherein the first item of content is selected from among different versions of a program.

12. A method in accordance with claim 10, wherein the first item of content is selected from among items of content having different lengths of time.

13. A method in accordance with claim 1, further comprising the step of:
configuring at least one of the first or second item of content based on the user profile.

14. A non-transitory storage medium storing a computer program executable by a processor based system, the computer program causing the processor based system to execute steps comprising: receiving a first item of content;
determining a first remaining amount of time from a difference between a playing time of the first item of content and a fixed period of time;
selecting a second item of content based on information relating to a viewer and with a playing time of the second item of content equal to or less than the first remaining amount of time, wherein the selecting the second item of content further comprises both determining whether to increase a number of items of content to be played back within the first remaining amount of time and determining whether to increase a playing time of one or more of the number of items of content to be played back within the first remaining amount of time;
providing the first item of content and the second item of content; and modifying, prior to the providing the second item of content, the run time of the second item of content such that a modified run time of the second item of content fits within the first remaining amount of time;
wherein the first item of content is provided by broadcasting to a plurality of users; and
wherein the second item of content is selected from a group of content comprising a plurality of items of content that could each serve as the second item of content.

15. The storage medium of claim 14, wherein the first item of content is scheduled to be played within the fixed period of time, and wherein the providing further comprises playing the first item of content and the second item of content within the fixed period of time for the viewer.

16. The storage medium of claim 14, further comprising:
selecting a version of the first item of content based on a viewer profile.

17. A system for use in providing content to a user, comprising:
a receiver configured to receive a primary content with a playing time less than a fixed period of time where the primary content is broadcasted to a plurality of users;
a viewer profile module configured to receive profile information relating to a viewer; and
an allocating module coupled to the receiver and the viewer profile module, the allocating module configured to calculating a remaining amount of time between an end of a run time of the primary content and an end of the fixed period of time, and the allocating module further configured to select additional content based on the viewer profile such that a run time of the additional content being equal to or less than the remaining amount of time and a playing of the primary content and the additional content is within the fixed period of time, wherein the allocating module, in selecting the additional content, is further configured to determine whether to increase a number of items of content to be played back within the remaining amount of time and determine whether to increase a playing time of one or more of the number of items of content to be played back within the remaining amount of time, wherein the allocating module is further configured to modify a playing time of the additional content to fill the remaining time between the playing time of the primary content and the fixed period of time;
wherein the additional content is selected from a group of content comprising a plurality of items of content that could each serve as the additional content.

18. The system of claim 17, wherein the allocating module is further configured to select a version of the primary content based on the viewer profile prior to selecting the additional content.

19. A method for providing content, comprising:
receiving a primary content scheduled to be played within a fixed period of time, the primary content comprising a playing time less than the fixed period of time, wherein the primary of content is broadcasted to a plurality of viewers; and
calculating, using a processor based apparatus, a remaining amount of time between the playing time of the primary content and the fixed period of time;
selecting additional content based on a viewer profile associated with a viewer and with a playing time of the additional content being equal to or less than the remaining amount of time, wherein the additional content is selected from a group of content comprising a plurality of items of content that could each serve as the additional content, wherein the selecting the additional content further comprises both determining whether to increase a number of items of content to be played back within the remaining amount of time and determining whether to increase a playing time of one or more of the number of items of content to be played back within the remaining amount of time;
providing the primary content and the additional content to the viewer to be played within the fixed period of time; and
modifying, prior to the providing the additional content, the run time of the additional content such that a modified run time of the additional content fits within the remaining amount of time between the playing time of the primary content and the fixed period of time.

20. The method of claim 19, further comprising:
selecting a version of the additional content configured to fill the remaining time between the playing time of the primary content and the fixed period of time.

21. The method of claim 20, further comprising:
selecting the additional content from at least one of a version of an advertisement or an unplayed scene from the primary content.

22. The method of claim 19, further comprising:
selecting a version of the primary content based on the viewer profile.

23. The method of claim 19, wherein the additional content further comprises a plurality of items of content, wherein the combined playing time of the plurality of items of content fills the remaining time between the playing time of the primary content and the fixed period of time.

24. A method in accordance with claim 1, wherein the modifying the run time of the second item of content comprises modifying the run time of the second item of content when the second item of content has a run time that is less than the first remaining amount of time such that a modified run time of the second item of content substantially fills the first remaining amount of time between the end of the run time of the first item of content and the end of the fixed period of time.

25. A method in accordance with claim 1, further comprising the step of:

selecting shorter versions of a plurality of items of multiple different contents, including the second item of content, to realize an increase in a number of items of different content to be played back within the first remaining amount of time.

26. A method in accordance with claim 1, further comprising the step of:
modifying the primary content based on the viewer profile resulting in a modification in run time of the first item of content and the end of the run time;
wherein the calculating the first remaining amount of time comprises recalculating the first remaining amount of time between the modified end of the modified run time of the first item of content and the end of a fixed period of time; and
wherein the selecting the second item of content comprises selecting the second item of content with the run time of the second item of content being equal to or less than the recalculated first remaining amount of time.

* * * * *